US012249788B2

(12) United States Patent
Horiguchi et al.

(10) Patent No.: US 12,249,788 B2
(45) Date of Patent: Mar. 11, 2025

(54) TERMINAL MODULE

(71) Applicant: SUMITOMO WIRING SYSTEMS, LTD., Mie (JP)

(72) Inventors: Yuki Horiguchi, Mie (JP); Ryousuke Giga, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 330 days.

(21) Appl. No.: 17/908,498

(22) PCT Filed: Mar. 1, 2021

(86) PCT No.: PCT/JP2021/007696
§ 371 (c)(1),
(2) Date: Aug. 31, 2022

(87) PCT Pub. No.: WO2021/177225
PCT Pub. Date: Sep. 10, 2021

(65) Prior Publication Data
US 2023/0101222 A1 Mar. 30, 2023

(30) Foreign Application Priority Data
Mar. 6, 2020 (JP) ................................ 2020-038708

(51) Int. Cl.
*H01R 13/52* (2006.01)

(52) U.S. Cl.
CPC ..... *H01R 13/5202* (2013.01); *H01R 13/5213* (2013.01); *H01R 13/5216* (2013.01)

(58) Field of Classification Search
None
See application file for complete search history.

(56) References Cited

U.S. PATENT DOCUMENTS 4,690,478 A * 9/1987 Rahrig ................. H01R 13/521 439/852
4,978,314 A * 12/1990 Maejima ............ H01R 13/5205 439/417
5,607,318 A 3/1997 Wakata et al.
5,836,788 A * 11/1998 Torii .................. H01R 13/5205 439/275
5,890,927 A * 4/1999 Yashima ............ H01R 13/4367 439/587

(Continued)

FOREIGN PATENT DOCUMENTS

CN 205657247 U 10/2016
JP S62-040782 U1 3/1987

(Continued)

OTHER PUBLICATIONS

International Search Report issued on May 11, 2021 for WO 2021/177225 A1 (6 pages).

*Primary Examiner* — Tho D Ta
(74) *Attorney, Agent, or Firm* — Venjuris, P.C.

(57) ABSTRACT

A terminal module (10) is provided with a terminal fitting (12) to be connected to an end part of a cable (11), a rubber plug (13) to be held in close contact with the outer periphery of the cable (11), a housing (14) for supporting the terminal fitting (12), and a cover (15) to be mounted on the housing (14) to cover the terminal fitting (12). The rubber plug (13) is sandwiched and held between the housing (14) and the cover (15).

5 Claims, 9 Drawing Sheets

(56) References Cited

U.S. PATENT DOCUMENTS

| | | | | |
|---|---|---|---|---|
| 6,146,198 | A * | 11/2000 | Maeda ................. | H01R 13/501<br>439/587 |
| 6,485,325 | B1 | 11/2002 | Fukuda | |
| 9,935,392 | B2 * | 4/2018 | Ito ........................ | H01R 13/533 |
| 2015/0155670 | A1 | 6/2015 | Gardner | |

FOREIGN PATENT DOCUMENTS

| | | | |
|---|---|---|---|
| JP | H07-193966 | A | 7/1995 |
| JP | H09-147967 | A | 6/1997 |
| JP | H11-067330 | A | 3/1999 |
| JP | 2002-008745 | A | 1/2002 |
| JP | 2017-010734 | A | 1/2017 |
| JP | 2017-135071 | A | 8/2017 |

* cited by examiner

TERMINAL MODULE

CROSS REFERENCE TO RELATED APPLICATIONS

This application is a national phase of PCT application No. PCT/JP2021/007696, filed on 1 Mar. 2021, which claims priority from Japanese patent application No. 2020-038708, filed on 6 Mar. 2020, all of which are incorporated herein by reference.

TECHNICAL FIELD

The present disclosure relates to a terminal module.

BACKGROUND

Patent Document 1 describes a first sub-connector (hereinafter, referred to as a terminal module). The terminal module includes a casing and a pair of terminals to be accommodated into a pair of terminal receiving spaces of the casing. The respective terminals are connected to a twisted pair cable via fixing portions formed in end parts. The terminal module of Patent Document 1 has no waterproof function. It is considered to apply waterproofing techniques disclosed in Patent Documents 2 to 5 as a means for providing the waterproof function to the terminal module.

PRIOR ART DOCUMENT

Patent Document

Patent Document 1: JP 2015-537327 A
Patent Document 2: JP H09-147967 A
Patent Document 3: JP H07-193966 A
Patent Document 4: JP 2017-010734 A
Patent Document 5: JP 2017-135071 A

SUMMARY OF THE INVENTION

Problems to be Solved

However, the waterproofing techniques disclosed in Patent Documents 2 to 5 relate to a structure in which a cover member is mounted on a rear side of a main part (casing part) for accommodating terminals and a rubber plug and the like are held by the cover member. Thus, if the waterproofing techniques of Patent Documents 2 to 5 are applied to the terminal module of Patent Document 1, the terminal module may be enlarged.

Accordingly, the present disclosure aims to provide a terminal module capable of avoiding enlargement.

Means to Solve the Problem

The present disclosure is directed to a terminal module with a terminal fitting to be connected to an end part of a cable, a rubber plug to be held in close contact with an outer periphery of the cable, a housing for supporting the terminal fitting, and a cover to be mounted on the housing to cover the terminal fitting, the rubber plug being sandwiched and held between the housing and the cover.

Effect of the Invention

According to the present disclosure, it is possible to provide a terminal module capable of avoiding enlargement.

DETAILED DESCRIPTION TO EXECUTE THE INVENTION

Description of Embodiments of Present Disclosure

Figure 1:
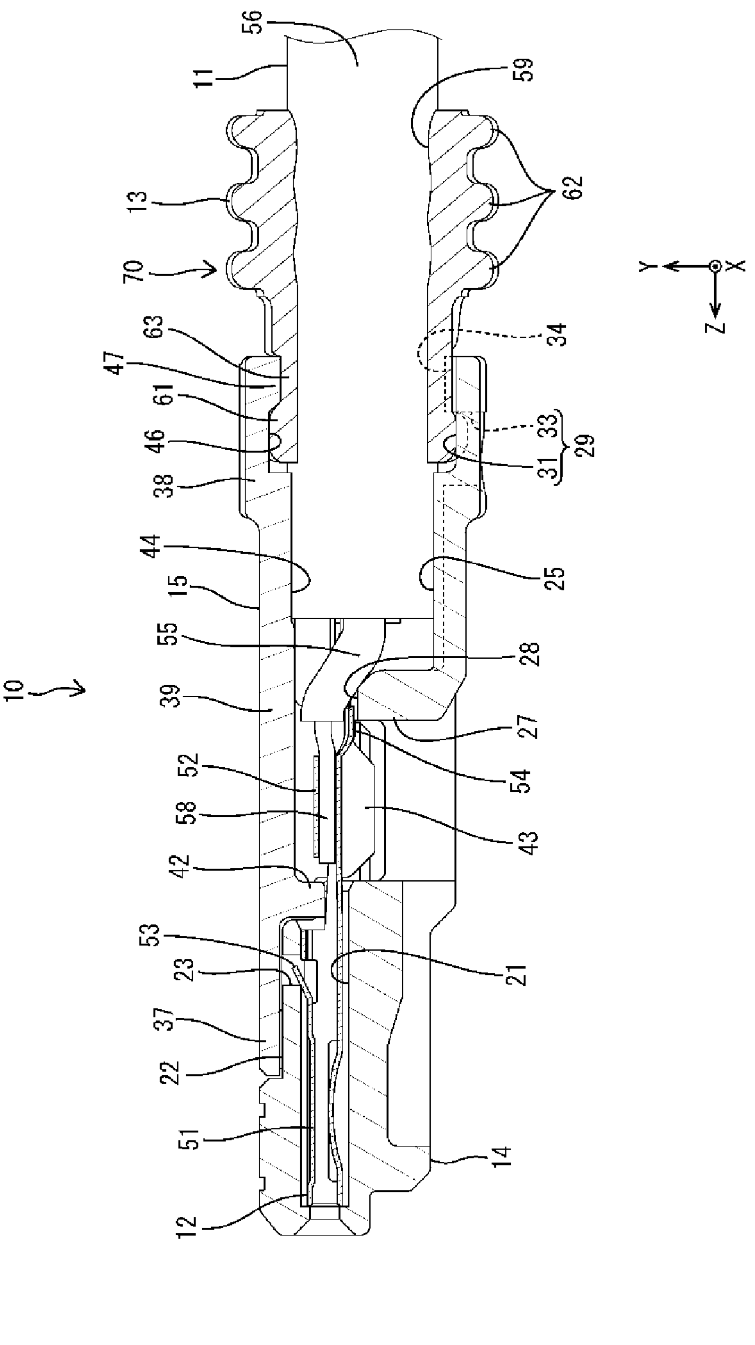
FIG. 1 is a side view in section of a terminal module according to one embodiment.

First, embodiments of the present disclosure are listed and described.

(1) The terminal module of the present disclosure is provided with a terminal fitting to be connected to an end part of a cable, a rubber plug to be held in close contact with an outer periphery of the cable, a housing for supporting the terminal fitting, and a cover to be mounted on the housing to cover the terminal fitting, the rubber plug being sandwiched and held between the housing and the cover. According to this configuration, the cover is mounted on the housing, the terminal fitting is covered by the cover, and the rubber plug is sandwiched and held between the housing and the cover. Thus, the housing and the cover can have a function of holding the terminal fitting and a function of holding the rubber plug. As a result, it is not necessary to provide a dedicated cover member or the like for holding the rubber plug, an entire configuration can be simplified and enlargement can be avoided.

(2) The rubber plug may include a seal lip projecting along a circumferential direction on an outer periphery and the seal lip may be arranged to be exposed outside the housing and the cover. According to this configuration, when the terminal module is inserted into a module accommodating portion of a main housing, the seal lip is held in close contact with the inner peripheral surface of the module accommodating portion to seal the inside of the main housing in a liquid-tight manner.

(3) Preferably, the rubber plug includes a flange portion projecting along a circumferential direction on an outer periphery, and the housing and the cover include groove portions into which the flange portion is fit. According to this configuration, a structure for holding the rubber plug between the housing and the cover can be easily realized. Particularly, since a part for locking an insulation barrel of the terminal fitting can be, for example, utilized as the flange portion of the rubber plug, a large design change of a conventional rubber plug structure is not necessary. In some cases, a conventional rubber plug may be used as it is.

(4) At least one of the housing and the cover may be provided with an opening, and the flange portion may be visually confirmable through the opening. According to this configuration, the disposed position and state of the flange portion can be confirmed through the opening. As a result, the rubber plug can be prevented from being improperly held between the housing and the cover.

(5) The housing and the cover may include fixing portions and escaping portions arranged side by side in the circumferential direction of the rubber plug in the groove portions, the fixing portions may be in the form of projections for locking the outer periphery of the rubber plug and the escaping portions may be in the form of recesses escaping from the outer periphery of the rubber plug. According to this configuration, by locking the projection-like fixing portions to the outer periphery of the rubber plug, the rubber plug is compressed and deformed parts of the compressed rubber plug can enter the escaping portions. In this way, the rubber plug can be prevented from being shifted in the circumferential direction between the housing and the cover. Further, since the fixing portions are provided in the groove portions, a state where the flange portion is fit in the groove portions can be satisfactorily maintained.

DETAILS OF EMBODIMENT OF PRESENT DISCLOSURE

A specific example of a terminal module of the present disclosure is described below with reference to the drawings. Note that the present invention is not limited to these illustrations and is intended to be represented by claims and include all changes in the scope of claims and in the meaning and scope of equivalents.

EMBODIMENT

As shown in FIG. 1, a terminal module 10 according to one embodiment is provided with a pair of terminal fittings 12 (see FIG. 4 to see that the “pair” of terminal fittings are provided) to be connected to a cable 11, a rubber plug 13 to be held in close contact with the outer periphery of the cable 11, a housing 14 for supporting the respective terminal fittings 12, and a cover 15 to be put on the housing 14. The terminal module 10 is inserted into a module accommodating portion of a main housing of an unillustrated connector. By connecting the main housing to an unillustrated mating main housing with the terminal module 10 accommodated in the main housing, the respective terminal fittings 12 are electrically connected to unillustrated mating terminal fittings.

Note that, in this specification, an arrangement direction of the cover 15 and the housing 14 is defined as a “vertical direction”. A side where the cover 15 is located with respect to the housing 14 is referred to as an upper side, and an opposite side is referred to as a lower side. Further, an arrangement direction of the housing 14 and a projecting part of the rubber plug 13 projecting from the housing 14 is defined as a “front-rear direction”. A side where the projecting part of the rubber plug 13 is located with respect to the housing 14 is referred to as a rear side, and an opposite side is referred to as a front side. Further, a direction intersecting, specifically, orthogonal to both the “vertical direction” and the “front-rear direction” is defined as a “width direction”. In the drawings, a rightward direction along the width direction is expressed as an “X direction”, an upward direction is expressed as a “Y direction” and a forward direction is expressed as a “Z direction” when the terminal module 10 is viewed from front.

(Housing)

Figure 5:
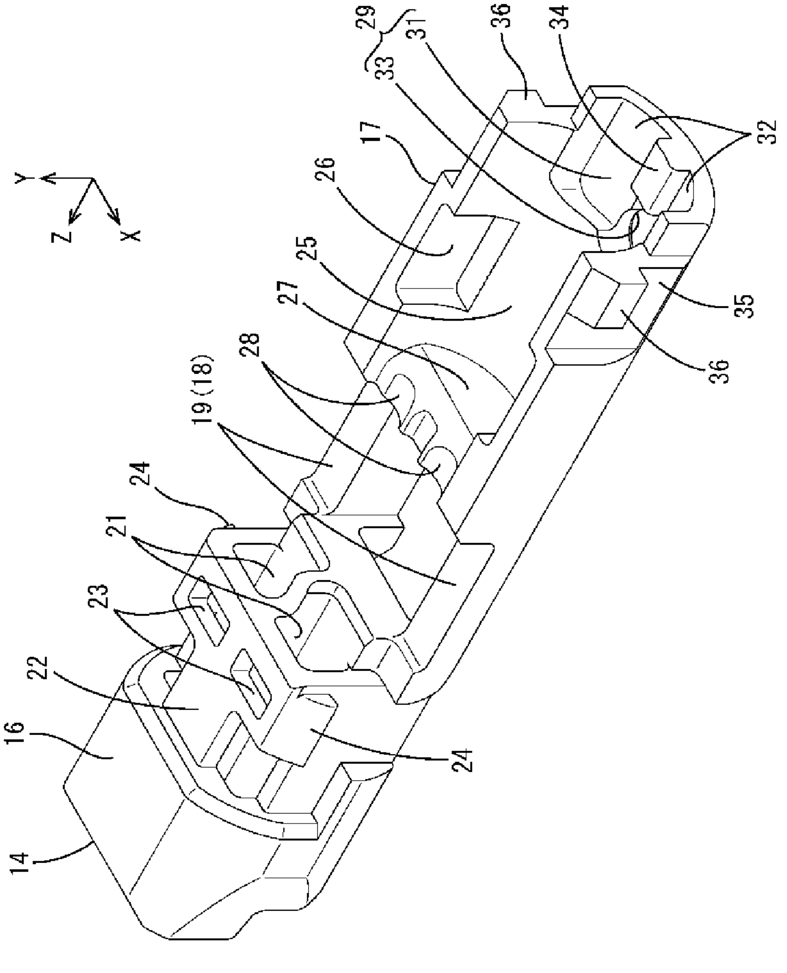
FIG. 5 is a perspective view of a housing.
Figure 6:
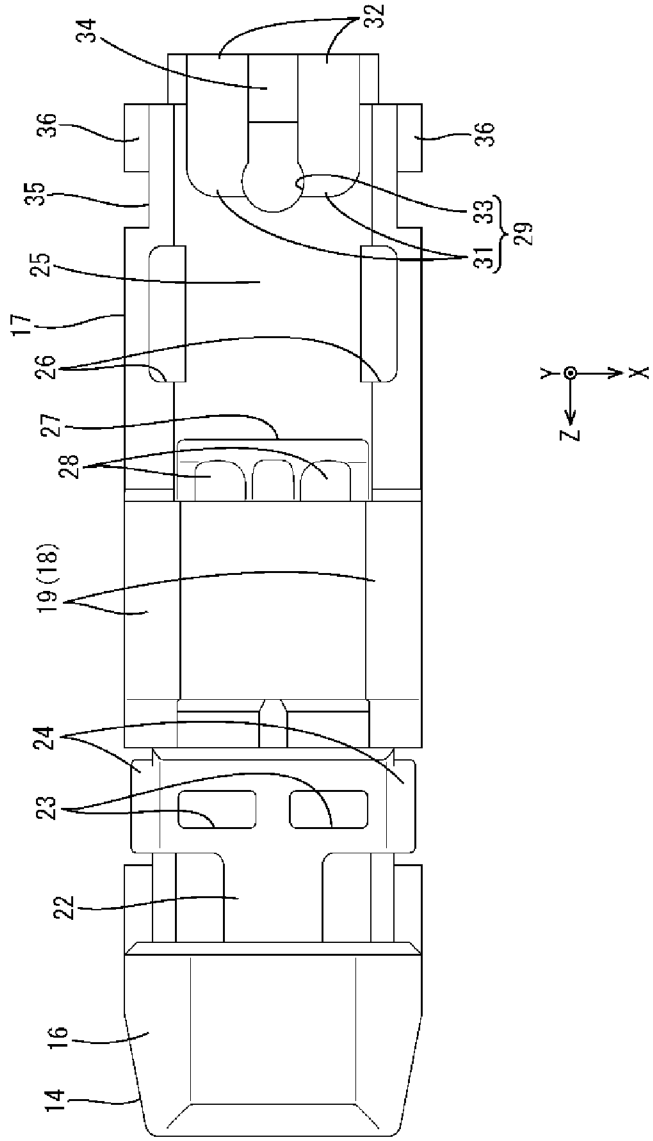
FIG. 6 is a plan view of the housing.

The housing 14 is made of synthetic resin and has a shape long in the front-rear direction as shown in FIGS. 5 and 6. The housing 14 includes a first housing portion 16 located in a front part, a second housing portion 17 located in a rear part and a third housing portion 18 located between the first and second housing portions 16, 17.

The third housing portion 18 is composed of a pair of bridge portions 19 linking the first and second housing portions 16, 17. The front ends of the respective bridge portions 19 are coupled to both end parts in the width direction of the first housing portion 16 and the rear ends of the respective bridge portions 19 are coupled to both end parts in the width direction of the second housing portion 17.

As shown in FIG. 5, the first housing portion 16 includes a pair of cavities 21 arranged in the width direction. Each cavity 21 penetrates through the first housing portion 16 in the front-rear direction. The outer surface of the first housing portion 16 has a front mounting portion 22 dented from a front part in a rear part. A front part (first cover portion 37 to be described later) of the cover 15 is put in the front mounting portion 22.

As shown in FIG. 5, the first housing portion 16 includes a pair of lance holes 23 arranged in the width direction and vertically penetrating from the respective cavities 21 to the front mounting portion 22. As shown in FIG. 1, a later-described locking lance 53 of the terminal fitting 12 is fit into each lance hole 23. As shown in FIGS. 5 and 6, the first housing portion 16 includes a pair of claw-like front lock portions 24 on both sides in the width direction of the front mounting portion 22. The respective front lock portions 24 are fit into later-described front lock holes 41 of the cover 15 (see FIG. 3).

As shown in FIG. 5, the second housing portion 17 includes an arcuately curved cable supporting portion 25 in the upper surface (inner surface) of a front side. The cable supporting portion 25 is a surface for supporting the cable 11. As shown in FIG. 6, a pair of recesses 26 with open upper ends are provided in both end parts in the width direction of the cable supporting portion 25.

The second housing portion 17 includes a wall portion 27 partitioning between the cable supporting portion 25 and the third housing portion 18 in a front end part. The wall portion 27 has supporting surfaces 28 in the form of concave curved surfaces for positioning and supporting rear end parts (supporting pieces 54 to be described later) of the respective terminal fittings 12 in an upper end surface.

As shown in FIG. 6, the second housing portion 17 includes a housing-side groove portion 29 in the upper surface (inner surface) of a rear side. A lower half of the rubber plug 13 corresponds to and is disposed in the housing-side groove portion 29. The housing-side groove portion 29 has a pair of curved bottomed recessed surfaces 31 dented from surrounding surfaces (including the cable supporting portion 25) on both sides in the width direction. Each recessed surface 31 is in the form of a strip long in the front-rear direction in a plan view. Rear parts of the respective recessed surfaces 31 serve as a pair of housing-side escaping portions 32 and are open in the rear end of the housing 14. The respective housing-side escaping portions 32 are continuous with front parts of the respective recessed surfaces 31 without any step.

Figure 2:
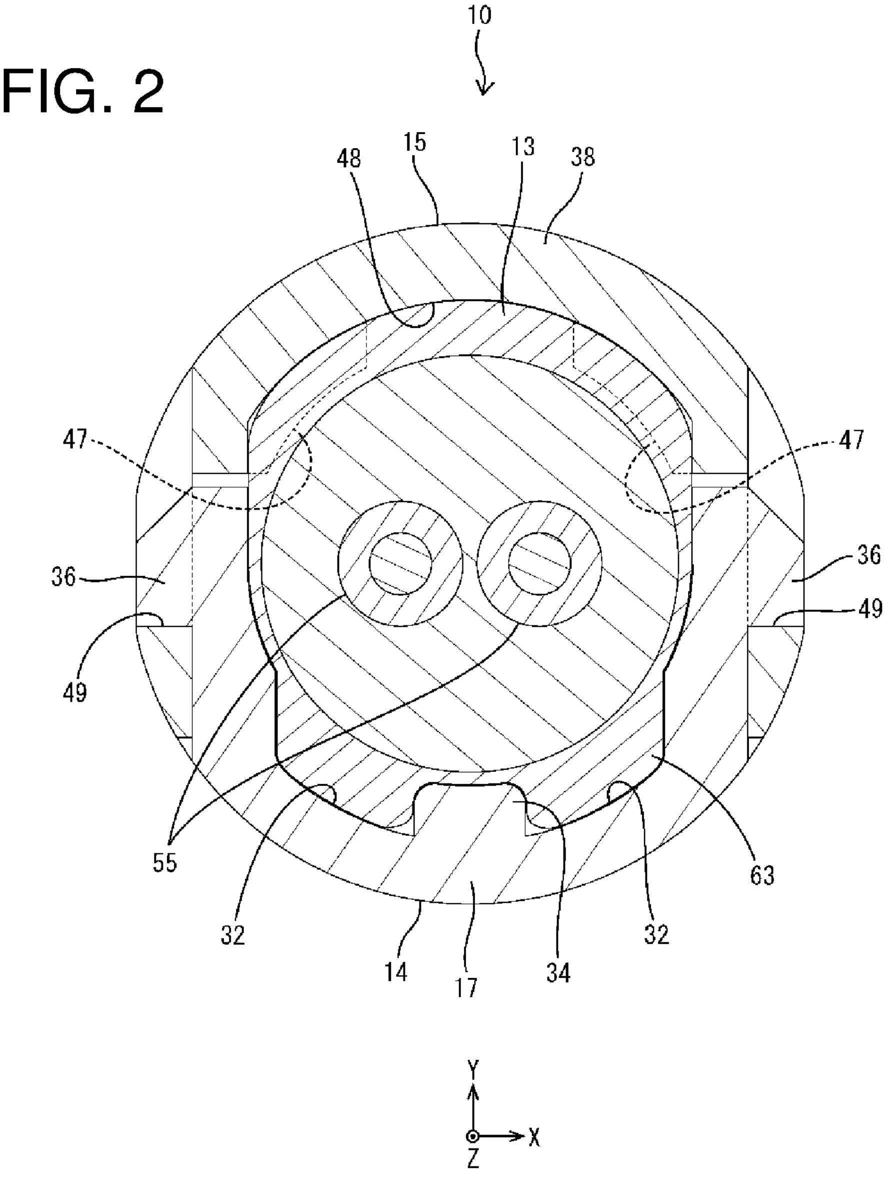
FIG. 2 is a transverse section of the terminal module.

Further, the housing-side groove portion 29 includes an opening 33 penetrating from the upper surface (inner surface) to the lower surface (outer surface) between the respective recessed surfaces 31 on a central side in the width direction. A front part of the opening 33 has an arcuate shape. A rear part of the opening 33 has a rectangular shape and communicates with the front part. The housing-side groove portion 29 includes a housing-side fixing portion 34 behind the opening 33. As shown in FIG. 5, the housing-side fixing portion 34 is in the form of a projecting base and located in the rear end of the housing 14. As shown in FIG. 2, the tip surface (upper surface) of the housing-side fixing portion 34 in a projecting direction is formed into a curved recess. The housing-side fixing portion 34 is located between the housing-side escaping portions 32 in the width direction (also a circumferential direction of the rubber plug 13) and arranged side by side with the respective housing-side escaping portions 32.

As shown in FIGS. 5 and 6, the second housing portion 17 includes a rear mounting portion 35 dented from the outer surface of the front side in the outer surface of the rear side. A rear part (second cover portion 38 to be described later) of the cover 15 is put in the rear mounting portion 35. The second housing portion 17 includes a pair of claw-like rear lock portions 36 on both sides in the width direction of the rear mounting portion 35. The respective rear lock portions 36 are located in the upper end of the second housing portion 17. The respective rear lock portions 36 and the housing-side groove portion 29 are positioned to overlap each other in the front-rear direction. As shown in FIG. 2, the respective rear lock portions 36 are fit into later-described rear lock holes 49 of the cover 15.

(Cover)

Figure 3:
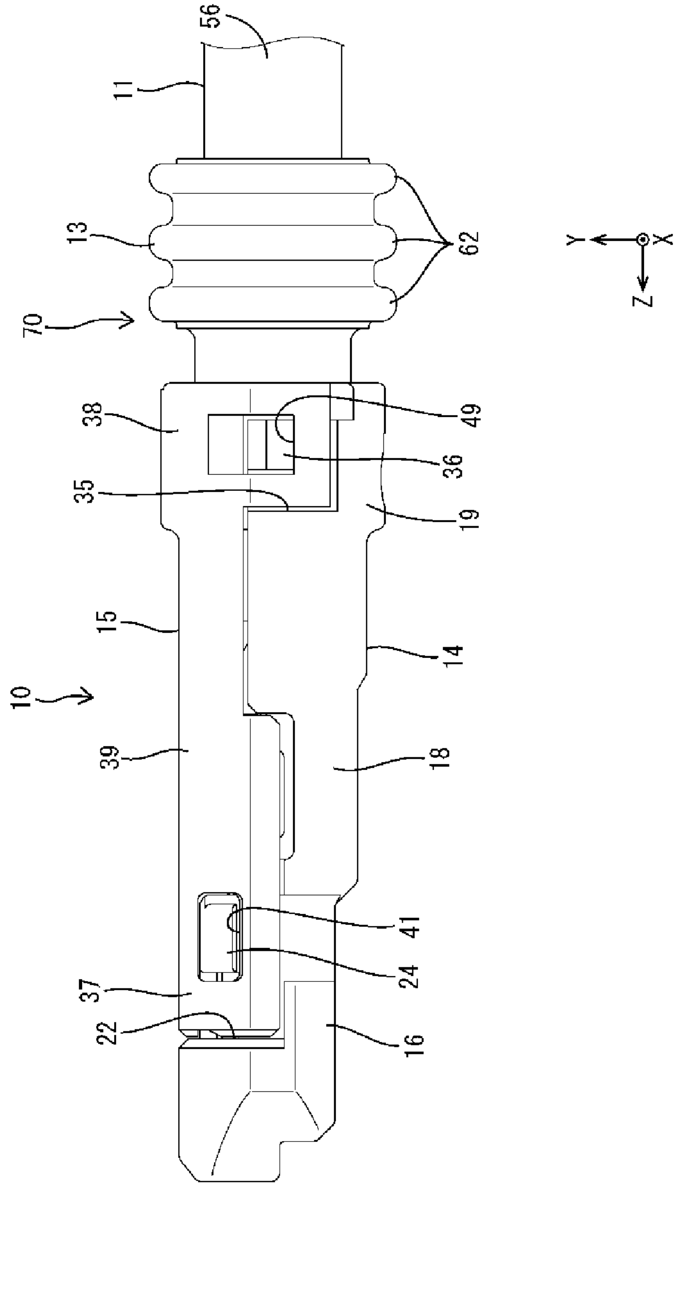
FIG. 3 is a side view of the terminal module.
Figure 7:
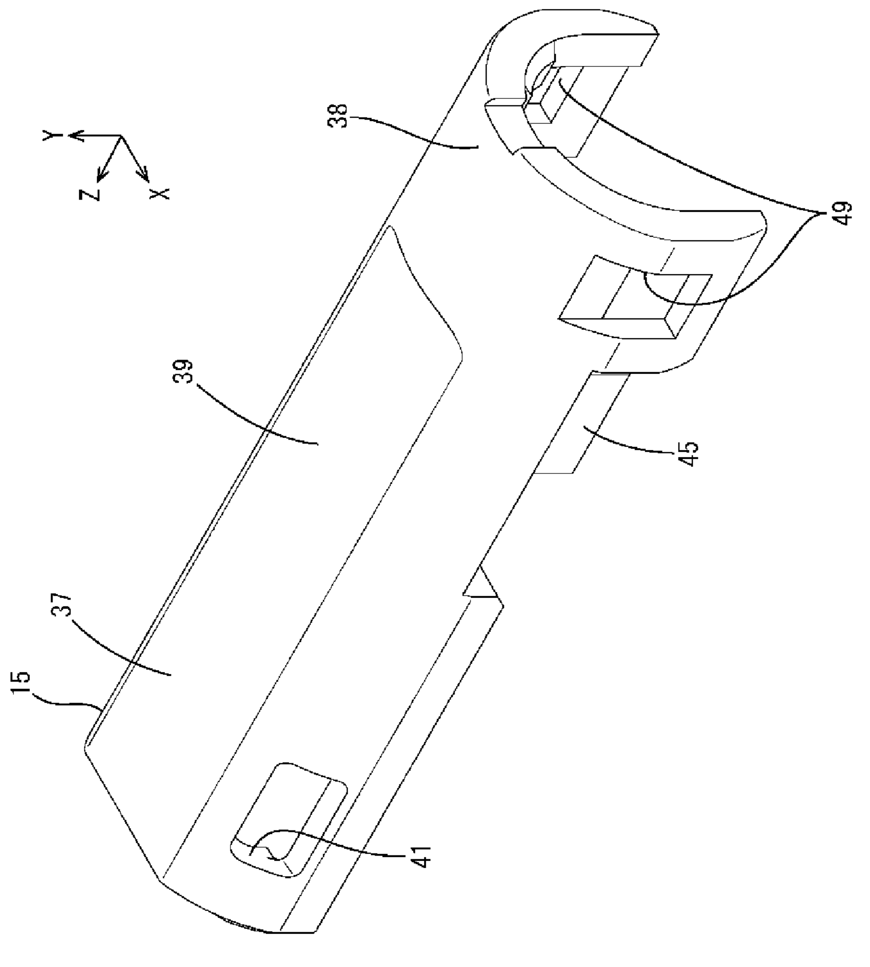
FIG. 7 is a perspective view of a cover.
Figure 8:
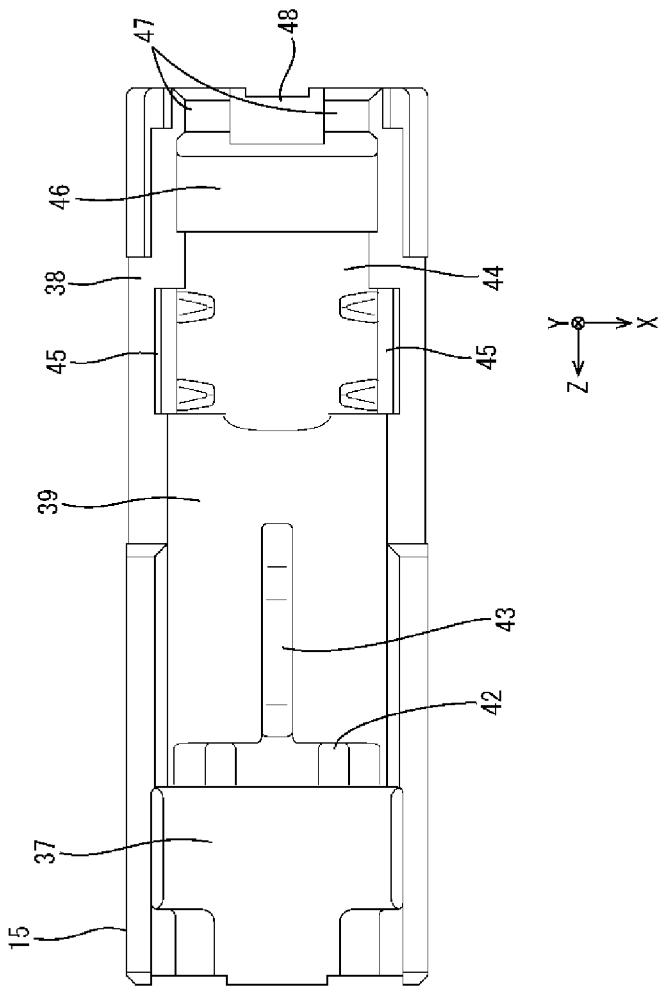
FIG. 8 is a bottom view of the cover.

The cover 15 is made of synthetic resin and, as shown in FIGS. 7 and 8, shaped to be long in the front-rear direction. As shown in FIG. 3, the cover 15 is dimensioned to be able to cover a region of the upper surface of the housing 14 except the front part of the first housing portion 16. The cover 15 includes the first cover portion 38 located in a front part, the second cover portion 38 located in a rear part and a third cover portion 39 located between the first and second cover portions 37, 38.

The first cover portion 37 is shaped to cover the front mounting portion 22 of the first housing portion 16. The first cover portion 37 includes the pair of front lock holes 41 (only one is shown in FIGS. 3 and 7) in side wall parts on both sides in the width direction.

As shown in FIG. 8, the third cover portion 39 includes a rib-like retainer portion 42 along the width direction partitioning between the rear end of the first cover portion 37 and the third cover portion 39 and a rib-like partitioning portion 43 extending rearward from a central part in the width direction of the retainer portion 42. A downward projection dimension of the partitioning portion 43 is larger than that of the retainer portion 42. The retainer portion 42 has a function of locking the respective terminal fittings 12 (see FIG. 1). The partitioning portion 43 has a function of partitioning between the respective terminal fittings 12 (see FIG. 4).

As shown in FIG. 8, the second cover portion 38 includes an arcuately curved cable covering portion 44 in the lower surface (inner surface) of a front side. A pair of plate-like projecting pieces 45 corresponding to the respective recesses 26 of the second housing portion 17 are provided on both end parts in the width direction of the cable covering portion 44.

The second cover portion 38 includes a curved bottomed cover-side groove portion 46 dented from surrounding surfaces in the lower surface (inner surface) of a rear side. An upper half of the rubber plug 13 corresponds to and is disposed in the cover-side groove portion 46. As shown in FIG. 8, the cover-side groove portion 46 is in the form of a strip long in the width direction (circumferential direction) in a bottom view.

The cover-side groove portion 46 includes a pair of cover-side fixing portions 47 on both sides in the width direction of a rear part. Each cover-side fixing portion 47 is in the form of a projecting base and located in the rear end of the cover 15. The tip surface (lower surface) of each cover-side fixing portion 47 in a projecting direction is formed into a curved recess. The respective cover-side fixing portions 47 are arranged at positions corresponding to the respective housing-side fixing portions 34. The cover-side groove portion 46 includes a cover-side escaping portion 48 between the respective cover-side fixing portions 47 on a central side in the width direction of a rear part. The cover-side escaping portion 48 is open in the rear end of the cover 15. As shown in FIGS. 2 and 3, the second cover portion 38 includes a pair of the rear lock holes 49 in side wall parts on both sides in the width direction. The respective rear lock holes 49 and the cover-side groove portion 46 are positioned to overlap each other in the front-rear direction.

(Terminal Fittings)

Figure 9:
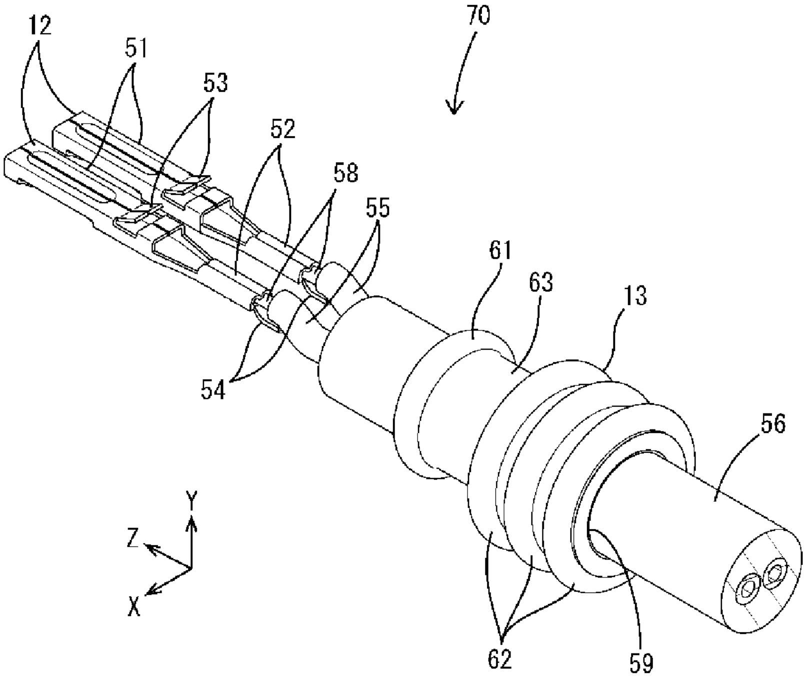
FIG. 9 is a perspective view of a cable having a rubber plug mounted thereon.

The terminal fitting 12 is formed into a shape elongated in the front-rear direction, such as by bending an electrically conductive metal plate. As shown in FIGS. 1 and 9, the terminal fitting 12 includes a tubular body portion 51 and a barrel portion 52 to be crimped and connected to a later-described conductor portion 58 of the cable 11 behind the body portion 51. The upper wall of the body portion 51 is provided with the deflectable and deformable locking lance 53 by cutting and raising. The locking lance 53 projects obliquely to an upper rear side and is shaped to be deflectable and deformable. A tab of an unillustrated mating terminal fitting is inserted into the body portion 51 from front to be connected. The body portion 51 includes the supporting piece 54 projecting obliquely to a lower rear side in a rear end part.

(Cable)

As shown in FIG. 9, the cable 11 includes paired wires 55 twisted each other (a twisted state is not shown in FIG. 9) and an insulating resin portion 56 for collectively covering the respective paired wires 55. The outer shape of the resin portion 56 has a circular cross-section. Front end parts of the respective paired wires 55 are untwisted and exposed from the resin portion 56. In the front end part of each of the paired wires 55, the conductor portion 58 constituted by a core wire is exposed by removing a coating. The conductor portion 58 is electrically connected to the corresponding terminal fitting 12 via the barrel portion 52.

(Rubber Plug)

The rubber plug 13 is made of rubber such as silicone rubber and formed into a tubular shape long in the front-rear direction as shown in FIGS. 1 and 9. The rubber plug 13 includes a sealing hole 59 penetrating in the front-rear direction inside. The cable 11 is inserted through the rubber plug 13. As shown in FIG. 1, the outer peripheral surface of the resin portion 56 is held in close contact with the inner peripheral surface of the sealing hole 59 of the rubber plug 13.

The rubber plug 13 includes a flange portion 61 projecting over an entire periphery in the circumferential direction. A lower half of the flange portion 61 is fit into the housing-side groove portion 29 and an upper half of the flange portion 61 is fit into the cover-side groove portion 46 (see FIG. 1).

The rubber plug 13 includes a plurality of seal lips 62 projecting over the entire periphery in the circumferential direction. Three seal lips 62 are arranged side by side in the front-rear direction (axial direction) on the outer periphery of a rear part of the rubber plug 13. A radial projection dimension of each seal lip 62 is larger than that of the flange portion 61. Further, the rubber plug 13 includes a thin portion 63 between the flange portion 61 and the respective seal lips 62. The thin portion 63 has a smaller radial thickness than the other parts of the rubber plug 13.

(Assembling Structure of Terminal Module)

The cable 11 is inserted through the sealing hole 59 of the rubber plug 13 and the respective terminal fittings 12 are connected to the respective paired wires 55 of the cable 11. In this way, a terminal unit 70 with rubber plug shown in FIG. 9 in which the rubber plug 13 is fit on the resin portion 56 is obtained.

Subsequently, the respective terminal fittings 12 of the terminal unit 70 with rubber plug are inserted into the respective cavities 21 of the housing 14 from behind. The locking lances 53 of the respective terminal fittings 12 are fit into the respective lance holes 23 of the housing 14 and the respective terminal fittings 12 are retained and locked in the cavities 21 (see FIG. 1). At this time, the barrel portions 52 of the respective terminal fittings 12 are arranged between the respective bridge portions 19 of the third housing portion 18. Further, a lower half of the resin portion 56 of the cable 11 is disposed on the cable supporting portion 25 of the second housing portion 17. Out of the paired wires of the cable 11, parts exposed from the resin portion 56 to connected parts to the barrel portions 52 are held in a bent state. Further, the supporting pieces 54 of the terminal fittings 12 are supported on the supporting surfaces 28 of the wall portion 27.

Further, a lower half of the flange portion 61 of the rubber plug 13 is fit into the housing-side groove portion 29. In particular, the lower half of the flange portion 61 is disposed on the respective recessed surfaces 31 and facing the opening 33. A lower half of the thin portion 63 of the rubber plug 13 is disposed on the housing-side fixing portion 34.

In this state, the cover 15 is put on the housing 14 from above. Here, the first cover portion 37 is overlapped on the front mounting portion 22 of the first housing portion 16, and the second cover portion 38 is arranged in close contact with the upper half of the rubber plug 13. After the side wall parts of the respective first and second cover portions 37, 38 are deflected and deformed, the respective front lock portions 24 and the respective rear lock portions 36 are fit into the respective front lock holes 41 and the respective rear lock holes 49, whereby the cover 15 is held in the housing 14 with separation restricted (see FIG. 3).

With the cover 15 held on the housing 14, the respective projecting pieces 45 of the second cover portion 38 are fit into the respective recesses 26 of the second housing portion 17, thereby preventing the cover 15 from being shifted in position with respect to the housing 14. Further, the partitioning portion 43 of the third cover portion 39 is inserted between the barrel portions 52 adjacent in the width direction, thereby preventing the respective terminal fittings 12 from being short-circuited (see FIG. 4). Further, the retainer portion 42 faces the body portions 51 of the respective terminal fittings 12 from behind, thereby preventing the respective terminal fittings 12 from coming out from the cavities 21 (see FIG. 1).

With the cover 15 held on the housing 14, the lower half of the flange portion 61 of the rubber plug 13 is fit into the cover-side groove portion 46 (see FIG. 1). Further, the upper half of the thin portion 63 of the rubber plug 13 is in contact with the respective cover-side fixing portions 47. Here, the flange portion 61 is compressed in the vertical direction between the housing 14 and the cover 15 and resiliently deformed radially inwardly. By locking the flange portion 61 to the front ends of the respective housing-side groove portion 29 and cover-side groove portion 46, the rubber plug 13 is restricted from being shifted forward with respect to the housing 14 and the cover 15. Further, by locking the flange portion 61 to the rear ends of the respective housing-side groove portion 29 and cover-side groove portion 46, the rubber plug 13 is restricted from being shifted rearward with respect to the housing 14 and the cover 15.

Further, the thin portion 63 is strongly compressed between the housing-side fixing portion 34 and the respective cover-side fixing portions 47, thereby being largely resiliently deformed radially inwardly (see FIG. 2). Deformed parts of the rubber plug 13 are partially allowed to escape to the respective housing-side escaping portions 32 and the cover-side escaping portion 48 in the circumferential direction of the rubber plug 13. In this way, the rubber plug 13 is unevenly meshed with the housing 14 and the cover 15 in the circumferential direction, thereby preventing a position shift in the circumferential direction between the housing 14 and the cover 15.

Figure 4:
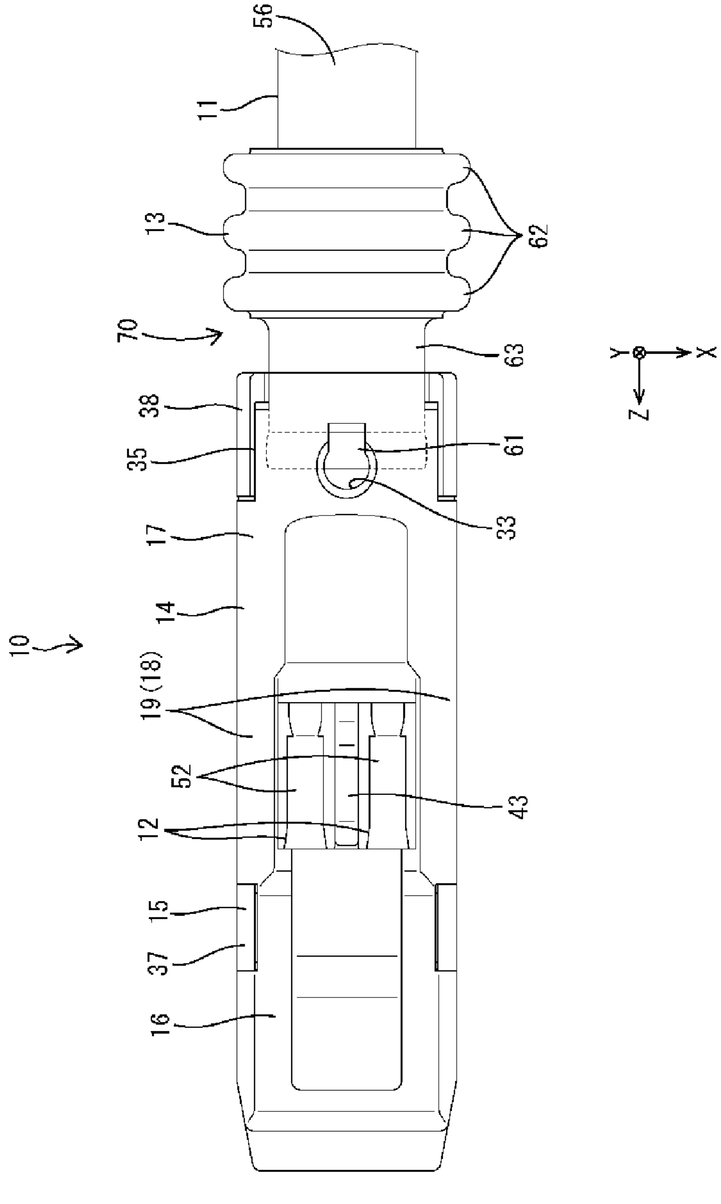
FIG. 4 is a bottom view of the terminal module.

In the above way, the rubber plug 13 is held positioned in the front-rear direction and circumferential direction with respect to the housing 14 and the cover 15. By holding the rubber plug 13 by the housing 14 and the cover 15, the terminal module 10 is completed. As shown in FIGS. 1, 3 and 4, each seal lip 62 is arranged to be exposed behind the housing 14 and the cover 15. As shown in FIG. 4, the flange portion 61 can be visually confirmed through the opening 33 by viewing the housing 14 from below. Thus, whether or not the flange portion 61 is properly fit in the housing-side groove portion 29 can be detected.

Thereafter, the terminal module 10 is inserted into the module accommodating portion of the unillustrated main housing. A resin locking lance of the unillustrated module accommodating portion is fit into between the respective bridge portions 19 of the third housing portion 18, whereby the terminal module 10 is retained in the main housing. In this state, each seal lip 62 is held in close contact with the inner peripheral surface of the module accommodating portion to seal the inside of the main housing in a liquid-tight manner.

As described above, according to this embodiment, the cover 15 is mounted on the housing 14, the terminal fittings 12 are covered by the cover 15 and the rubber plug 13 is sandwiched and held between the housing 14 and the cover 15. Thus, the housing 14 and the cover 15 can have both a function of holding the terminal fittings 12 and a function of holding the rubber plug 13. As a result, it is not necessary to provide a dedicated cover member or the like for holding the rubber plug 13, an entire configuration can be simplified and enlargement can be avoided.

Further, by fitting the flange portion 61 of the rubber plug 13 into the housing-side groove portion 29 and the cover-side groove portion 46, the rubber plug 13 can be prevented from being shifted in the front-rear direction (axial direction) with respect to the housing 14 and the cover 15 by a simple configuration. Since an existing structure for locking insulation barrels of the terminal fittings 12 can be utilized as the flange portion 61 of the rubber plug 13, a large design change of a conventional rubber plug structure is also not necessary.

Further, since the disposed position and state of the flange portion 61 can be visually confirmed through the opening 33 of the housing 14, the rubber plug 13 can be prevented from being improperly held between the housing 14 and the cover 15.

Furthermore, since the rubber plug 13 is compressed and the deformed parts of the rubber plug 13 can enter the respective housing-side escaping portions 32 and the cover-side escaping portion 48 by locking the housing-side fixing portion 34 and the respective cover-side fixing portions 47 to the outer periphery of the rubber plug 13, the rubber plug 13 can be prevented from being shifted in the circumferential direction between the housing 14 and the cover 15.

OTHER EMBODIMENTS OF PRESENT DISCLOSURE

The embodiment disclosed this time should be considered illustrative in all aspects, rather than restrictive.

Although the flange portion of the rubber plug is fit into the housing-side groove portion and the cover-side groove portion in the case of the above embodiment, the rubber plug may be configured to be locked by projections or the like on the housing side and the cover side without including the flange portion or the like as another embodiment.

Although the outer peripheries of the paired wires are surrounded by the resin portion in the cable in the case of the above embodiment, the cable may be a coated wire in which the outer periphery of a core wire is merely covered with a coating as another embodiment.

Although the flange portion of the rubber plug is compressed and resiliently deformed between the housing and the cover in the case of the above embodiment, the flange portion of the rubber plug may be maintained in a natural state without being compressed between the housing and the cover as another embodiment.

Although the opening is provided in the housing in the case of the above embodiment, an opening may be provided in the cover or openings may be provided in both the housing and the cover as another embodiment.

Although the housing is provided with the lock portions (front lock portions and rear lock portions) and the cover is provided with lock holes (front lock holes and rear lock holes) as a locking structure for the housing and the cover in the case of the above embodiment, the housing may be provided with lock holes and the cover may be provided with lock portions, contrary to the above embodiment, as another embodiment. Further, the numbers and arrangements of the lock holes and the lock portions are arbitrary and can be appropriately changed.

LIST OF REFERENCE NUMERALS

10 . . . terminal module
11 . . . cable
12 . . . terminal fitting
13 . . . rubber plug
14 . . . housing
15 . . . cover
16 . . . first housing portion
17 . . . second housing portion
18 . . . third housing portion
19 . . . bridge portion
21 . . . cavity
22 . . . front mounting portion
23 . . . lance hole
24 . . . front lock portion
25 . . . cable supporting portion
26 . . . recess
27 . . . wall portion
28 . . . supporting surface
29 . . . housing-side groove portion
31 . . . recessed surface
32 . . . housing-side escaping portion
33 . . . opening
34 . . . housing-side fixing portion
35 . . . rear mounting portion
36 . . . rear lock portion
37 . . . first cover portion
38 . . . second cover portion
39 . . . third cover portion
41 . . . front lock hole
42 . . . retainer portion
43 . . . partitioning portion
44 . . . cable covering portion
45 . . . projecting piece
46 . . . cover-side groove portion
47 . . . cover-side fixing portion
48 . . . cover-side escaping portion
49 . . . rear lock hole
51 . . . body portion
52 . . . barrel portion
53 . . . locking lance
54 . . . supporting piece
55 . . . paired wire
56 . . . resin portion
58 . . . conductor portion
59 . . . sealing hole
61 . . . flange portion
62 . . . seal lip
63 . . . thin portion
70 . . . terminal unit with rubber plug

What is claimed is:

1. A terminal module, comprising:
a terminal fitting to be connected to an end part of a cable;
a rubber plug to be held in close contact with an outer periphery of the cable;
a housing for supporting the terminal fitting; and
a cover to be mounted on the housing to cover the terminal fitting,
wherein
the rubber plug includes a first portion and a second portion extending axially from the first portion, the first portion configured to fit into the housing and the cover and the second portion configured to be exposed outside the housing and the cover, and
the first portion of the rubber plug is sandwiched and held between the housing and the cover.

2. The terminal module according to claim 1, wherein
the rubber plug includes a seal lip projecting along a circumferential direction on an outer periphery and
the seal lip is arranged to be exposed outside the housing and the cover.

3. The terminal module according to claim 1, wherein
the rubber plug includes a flange portion projecting along a circumferential direction on an outer periphery, and
the housing and the cover include groove portions into which the flange portion is fit.

4. The terminal module according to claim 3, wherein
at least one of the housing and the cover is provided with an opening, and
the flange portion is visually confirmable through the opening.

5. The terminal module according to claim 3, wherein
the housing and the cover include fixing portions and escaping portions arranged side by side in the circumferential direction of the rubber plug in the groove portions,
the fixing portions are in the form of projections for locking the outer periphery of the rubber plug and
the escaping portions are in the form of recesses escaping from the outer periphery of the rubber plug.

* * * * *